US008565167B2

(12) United States Patent
Chen et al.

(10) Patent No.: US 8,565,167 B2
(45) Date of Patent: Oct. 22, 2013

(54) SYSTEM AND METHODS FOR ACK/NAK FEEDBACK IN TDD COMMUNICATIONS

(75) Inventors: Peng Chen, Beijing (CN); Chunyan Gao, Beijing (CN); Esa Tiirola, Kempele (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 12/497,434

(22) Filed: Jul. 2, 2009

(65) Prior Publication Data

US 2011/0002276 A1   Jan. 6, 2011

(51) Int. Cl.
*H04W 4/00* (2009.01)

(52) U.S. Cl.
USPC ............ 370/329; 370/328; 370/330; 370/336

(58) Field of Classification Search
None
See application file for complete search history.

(56) References Cited

U.S. PATENT DOCUMENTS

| 2002/0163672 | A1* | 11/2002 | Yoshida et al. | 358/400 |
| 2009/0149188 | A1* | 6/2009 | McBeath et al. | 455/450 |
| 2009/0241004 | A1* | 9/2009 | Ahn et al. | 714/749 |
| 2010/0172428 | A1* | 7/2010 | Pani et al. | 375/262 |

OTHER PUBLICATIONS

3GPP TS 36.213 V8.5.0 (Dec. 2008); 3rd Generation Partnership Project; Technical Specification Group Radio Access Network; Evolved Universal Terrestrial Radio Access (E-UTRA); "Physical Layer Procedures" (Release 8); 74 pages.
3GPP TS 36.213 V8.7.0 (May 2009); 3rd Generation Partnership Project; Technical Specification Group Radio Access Network; Evolved Universal Terrestrial Radio Access (E-UTRA); "Physical Layer Procedures" (Release 8); 77 pages.
3GPP TS 36.212 V8.5.0 (Dec. 2008); 3rd Generation Partnership Project; Technical Specification Group Radio Access Network; Evolved Universal Terrestrial Radio Access (E-UTRA); "Multiplexing and Channel Coding" (Release 8); 58 pages.
3GPP TSG RAN WG1 Meeting #56bis (R1-091526); "UL ACK/NAK transmission in LTE-A"; Seoul, Korea, Mar. 23-27, 2009; 4 pages.

* cited by examiner

*Primary Examiner* — Anez Ebrahim
(74) *Attorney, Agent, or Firm* — Harrington & Smith (57) ABSTRACT

Systems and methods for providing an efficient mechanism for transmitting encoded downlink assignment index (DAI) and for signaling the ACK/NAK information corresponding to downlink grant allocations in an over the air radio telecommunications network with time division duplex (TDD) capability, where aggregation of component carriers (CCs) is used. Downlink control messages containing encoded DAI information are transmitted with downlink allocation grants. A receiver observes the encoded DAI and the downlink allocation grants and forms corresponding ACK/NAK signals. Method embodiments for forming the ACK/NAK signals for CC groups and frames or subframes are provided. The ACK/NAK signals are then encoded using method embodiments and transmitted over parallel channels for each CC group to the transmitter. By using method embodiments for selecting resources for use in the transmission, the last observed DL grant can be identified by the transmitter and the transmitter can detect an error at the receiver.

37 Claims, 6 Drawing Sheets

SYSTEM AND METHODS FOR ACK/NAK FEEDBACK IN TDD COMMUNICATIONS

TECHNICAL FIELD

The present invention is directed, in general, to communication systems and, more particularly, to a system and method for providing acknowledgement (ACK) and non-acknowledgement (NAK) feedback from a receiver in mobile user equipment to a transmitter in an enhanced base station using time division duplex (TDD) radio communications over an air interface with Long Term Evolution Advanced (LTE-A) configured communications terminals in a packet based communication system.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third generation partnership project long term evolution ("3GPP LTE") is the name generally used to describe an ongoing effort across the industry to improve the universal mobile telecommunications system ("UMTS") for mobile communications. The improvements are being made to cope with continuing new requirements and the growing base of users, and higher data rates and higher system capacity requirements. Goals of this broadly based project include improving communication efficiency, lowering costs, improving services, making use of new spectrum opportunities, and achieving better integration with other open standards and backwards compatibility with some existing infrastructure that is compliant with earlier standards.

The wireless communication systems as described herein are applicable to, for instance, 3GPP LTE compatible wireless communication systems and of interest is an aspect of LTE referred to as "evolved UMTS Terrestrial Radio Access Network," or E-UTRAN and also UTRAN communications systems. In E-UTRAN systems, the e-Node B may be, or is, connected directly to the access gateway ("aGW," sometimes referred to as the services gateway "sGW"). Each Node B may be in radio contact with multiple UEs (generally, user equipment including mobile transceivers or cellphones, although other devices such as fixed cellular phones, mobile web browsers, laptops, PDAs, MP3 players, and gaming devices with transceivers may also be UEs) via the radio Uu interface.

In the present discussion, particular attention is paid to enhancements presently being considered for Release 9 and Release 10 (sometimes referred to as "LTE Advanced") of the 3GPP standards. These future evolutions of LTE will have additional requirements and demands for increased throughput. Although the discussion uses E-UTRAN as the primary example, the application is not limited to E-UTRAN, LTE or 3GPP systems. In general, E-UTRAN resources are assigned more or less temporarily by the network to one or more UEs by use of allocation tables, or more generally by use of a downlink resource assignment channel or physical downlink control channel ("PDCCH"). The PDCCH is used to allocate resources in other channels, including the physical downlink shared channel ("PDSCH"). LTE is a packet-based system and, therefore, there may not be a dedicated connection reserved for communication between a UE and the network. Users are generally scheduled on a shared channel every transmission time interval ("TTI") by a Node B or an evolved Node B ("e-Node B"). A Node B or an e-Node B controls the communications between user equipment terminals in a cell served by the Node B or e-Node B. In general, one Node B or e-Node B serves each cell. An e-Node B may serve multiple cells. A Node B or e-Node B may be referred to as a "base station." Resources needed for data transfer are assigned either as one time assignments or in a persistent/semi-static way.

The LTE-A, also referred to as 4G, generally supports a large number of users per cell with quasi-instantaneous access to radio resources in the active state. The goals for LTE-A which is currently being developed as an implementation standard are to increase bandwidth to 1 Gbps for low mobility situations, and 100 Mbps for higher mobility situations. More generally, the goal for LTE-A and 4G is to provide a mobile device user with the same performance as, or similar performance to, a fixed station fiber optic internet connection. As proposed, LTE-A systems are to be backwards compatible with LTE Release 8 equipment so that the existing user equipment and eNBs (Release 8 and Release 9) can operate in LTE-A network. Similarly, LTE-A user equipment should be able to operate in existing (Release 8 and Release 9) networks.

In LTE and LTE-A systems, in order to facilitate scheduling on the shared channel, the e-Node B transmits a resource allocation to a particular UE in a physical downlink control channel (PDCCH) to the UE. The grant allocation information may be related to both uplink and downlink resources. The allocation information may include information about which physical resource blocks in the frequency domain are allocated to the scheduled user(s), the modulation and coding schemes to use, what the size of the transport block is, and the like.

The lowest layer of communication in the UTRAN or e-UTRAN system, Layer 1, is implemented by the Physical Layer ("PHY") in the UE and in the Node B or e-Node B. The PHY performs the physical transport of the packets between the UE and eNB over the air interface using radio frequency signals. In order to ensure a transmitted packet was received, an automatic retransmit request ("ARQ") and a hybrid automatic retransmit request ("HARQ") approach is provided. Thus, whenever the UE receives packets through one of several downlink channels, including dedicated channels and shared channels, the UE performs a communications error check on the received packets, typically a Cyclic Redundancy Check ("CRC"), and in a later subframe following the reception of the packets, transmits a response on the uplink channel to the e-Node B or base station. The UE response is either an Acknowledgment ("ACK") or a Non Acknowledgment ("NAK") message. If the response is a NAK, the e-Node B automatically retransmits the packets in a later subframe on the downlink ("DL"). In the same manner, any uplink ("UL") transmission from the UE to the e-Node B is responded to, at a specific subframe later in time, by a ACK/NAK message on the DL channel to complete the HARQ. In this manner, the packet communications system remains robust with a low latency time and fast turnaround time.

In order to accomplish the system performance goals of LTE-A, aggregation of component carriers (CC) is proposed. By aggregating the CCs, the necessary bandwidth to obtain the performance is obtained.

An aspect of the ACK/NAK signaling in the uplink channels by the UE to the eNB is that the UE cannot acknowledge missed DL grants that the UE is not aware of. That is, the UE only knows whether it receives the DL grants that it recognizes. A missed DL grant that is the last DL grant in a resource allocation on the PDCCH is not detectable by the UE. In order to make sure the eNB and UE share their understanding of the grants allocated in LTE systems, a downlink assignment index (DAI) is transmitted on the downlink. Reference is made to the 3GPP Technical Specification numbered 3GPP TS 36.213, entitled "Evolved Universal Terrestrial Radio Access (E-UTRA); Physical Layer Procedures (Release 8)"; Version 8.7.0, dated 05-2009, available from the 3gpp at the website URL www.3gpp.org; which is hereby incorporated by reference herein in its entirety. Chapter 7.3 of the TS 36.213 describes the DAI encoding for LTE Release 8. A two bit DAI field is included in the downlink grant transmitted to the UE on PDCCH. This information is made available to avoid higher layer errors in case of a downlink grant failure.

The 2-bit DAI is encoded. In LTE Release 8, a "pure counter" encoding scheme is used. This encoded DAI is transmitted to the UE so that the UE knows when a DL grant is missed. Without this information, the UEs ACK/NAK information provided on the uplink channel (PUCCH, for example) would be incomplete. In addition to the ACK/NAK signals, the UE may transmit other signals on the PUCCH. For LTE Release 8 devices, these control signals may include the channel quality indicator (CQI), scheduling request indicator (SR), the precoding matrix indicator (PMI) and so forth. Unless the UE has the DAI and knows how many DL grant allocations were expected, the ACK/NAK information transmitted by the UE as part of the uplink message may be misinterpreted by the receiving eNB. The use of the DAI field mitigates this possibility. The UE can know when to provide NAK or sometimes discontinuous transmission (DTX) information in the appropriate places in the UL message, so that the eNB and the UE both understand what happened in the previous downlink message cycle.

As presently proposed, LTE-A systems will apply the PUCCH of LTE Release 8 communications to transmit control signals. The PUCCH signals include ACK/NAK, CQI, and SR, for example. In LTE Release 8 for TDD, the UE can report ACK/NAK results for multiple DL subframes during one UL subframe. The ACK/NAK signaling for multiple DL subframes can be made using two modes; either ACK/NAK bundling or ACK/NAK multiplexing modes. The reader is again referred to the TS 36.213 Chapter 7.3 for more information.

In ACK/NAK bundling mode, the ACK/NAK bits are first bundled in the time domain to get one bit (for example, ACK/NAK bundling is a logical AND operation on the previous ACK/NAK bits) and the bundled bits are modulated and transmitted on the PUCCH, which is associated with the last detected DL grant.

In ACK/NAK multiplexing, a channel selection for PUCCH is used which enables transmission of 2-4 bits via a single PUCCH channel. The selected channel and the quadrature phase shift keyed (QPSK) constellation point used are determined based on the ACK/NAK/DTX states corresponding to multiple DL subframes as shown in Tables 10.1-2, 10.1-3 and 10.1-4 of 3GPP TS 36.213.

In order to reach the system performance goals of the LTE-A proposals, LTE-A adds the use of CC aggregation. This added feature introduces another degree of freedom for ACK/NAK feedback signaling that is transmitted on the PUCCH. A consequence of this extra degree of freedom is that more ACK/NAK bits, for example up to 20 bits for a case using 5 CCs in aggregate, are needed to be transmitted during one uplink subframe.

Problems associated with the LTE-A methods for ACK/NAK reporting on PUCCH in TDD include how to provide proper ACK/NAK feedback supporting CC aggregation; how to perform the performance trade-off between downlink throughput and UL coverage, that is, how to configure different feedback signaling profiles for multiple ACK/NAK bits to be signaled in the uplink; how to avoid certain error cases related to the configurable ACK/NAK feedback, and how to encode the DAI field for LTE-A with CC aggregation.

Notably, the use of the LTE Release 8 DAI encoding method for each CC, which is a straightforward approach, will result in additional error cases. These will occur with the failure of the last N consecutive DL allocation grants on each CC. So this simple approach will not be sufficient. A more comprehensive approach is needed.

To date, a method and system for efficiently implementing the ACK/NAK support needed for the physical uplink control channel (PUCCH) transmissions relating to the prior physical downlink control channel (PDCCH) transmission in a UE using the aggregated CCs of LTE-A has not been determined. Various error cases that would occur if prior art approaches are used necessitate a new method and system for ACK/NAK uplink messages in the LTE-A PUCCH channel.

A need thus exists for methods and systems to efficiently support the use of ACK/NAK uplink messages on the PUCCH channels for TDD UEs, when LTE-A aggregate component carrier capability is utilized, without the problems of the prior art approaches.

SUMMARY OF THE INVENTION

These and other problems are generally solved or circumvented, and technical advantages are generally achieved, by advantageous embodiments of the present invention which include an apparatus and methods according to an embodiment for efficiently transmitting ACK/NAK messages and DTX messages on PUCCH channels in an LTE-A system.

In one embodiment, a method for encoding a DAI value for transmission to a receiver is provided where a count is formed on an intra group basis for a group of component carriers and TDD subframes that are observable within a UE reception window (i.e., a set of component carriers and TDD subframes the UE may receive over the downlink shared channel PDSCH), and the DAI value is formed by a modulo operation on the count. In an alternative embodiment, the DAI count is formed on an inter group basis using a simple count of DL allocations over the group of component carriers (CCs) and TDD subframes in a UE reception window, and the DAI value is formed by applying a modulo operation on the DAI count.

In another embodiment, feedback of the ACK/NAK information and selectively DTX information corresponding to the observed downlink allocation grants received is provided. In one exemplary method embodiment, a receiver forms groups using semi-static grouping patterns. In a second exemplary method embodiment, the receiver forms groups using a dynamic grouping embodiment where the grouping information is set in a semi-static way or provided by a transmitter in a downlink signal.

In yet another embodiment, a method of transmitting ACK/NAK information from a receiver to a transmitter in an uplink message is provided. In this exemplary method embodiment, the receiver first bundles the ACK/NAK bits to generate M bundled ACK/NAK feedback bits, then a channel is selected from a group of available channels to carry the M feedback bits for each group, and finally the feedback signals are transmitted by the receiver on parallel channels contemporaneously.

In another embodiment, a software programmable UE is provided with a processor. A computer readable medium is provided with executable instructions disposed on it that, when executed by the processor, perform the steps of a method of grouping to signal ACK/NAK feedback signals and DTX signals on an uplink channel, bundling the ACK/NAK or DTX bits to generate M bundled feedback bits per group, selecting a channel to transmit the ACK/NAK/DTX signals on, and transmitting the M ACK/NAK/DTX feedback bits to the receiver on the selected channel.

In another embodiment, a method for handling errors in receiving DL grants is provided. A receiver signals the last received DL grant implicitly by selecting a resource that is related to the last received downlink grant for transmitting an uplink message to the transmitter. By determining which resource the receiver selected for the uplink message, the transmitter can confirm the receiver observed the downlink message previously sent by the transmitter, or if not, the transmitter can take steps to correct the error.

In another embodiment, a computer program is provided comprising executable instructions stored on a machine readable storage device, wherein when the instructions are performed by a programmable processor within a communications terminal configured to transceive signals on an over the air interface, the communications terminal performs the methods of identifying groups of frames or subframes to be transmitted in parallel over a plurality of aggregated component carriers to a second communications terminal over the air interface; indexing a downlink assignment index counter by counting the downlink allocation grant signals to be transmitted in the groups of frames or subframes; encoding the downlink assignment index counter into a downlink assignment index value by performing a modulo operation on the downlink assignment index counter; and transmitting the groups of frames or subframes including the downlink allocation grant signals and the downlink assignment index value to a receiver within the second communications terminal.

The foregoing has outlined rather broadly the features and technical advantages of the present invention so that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
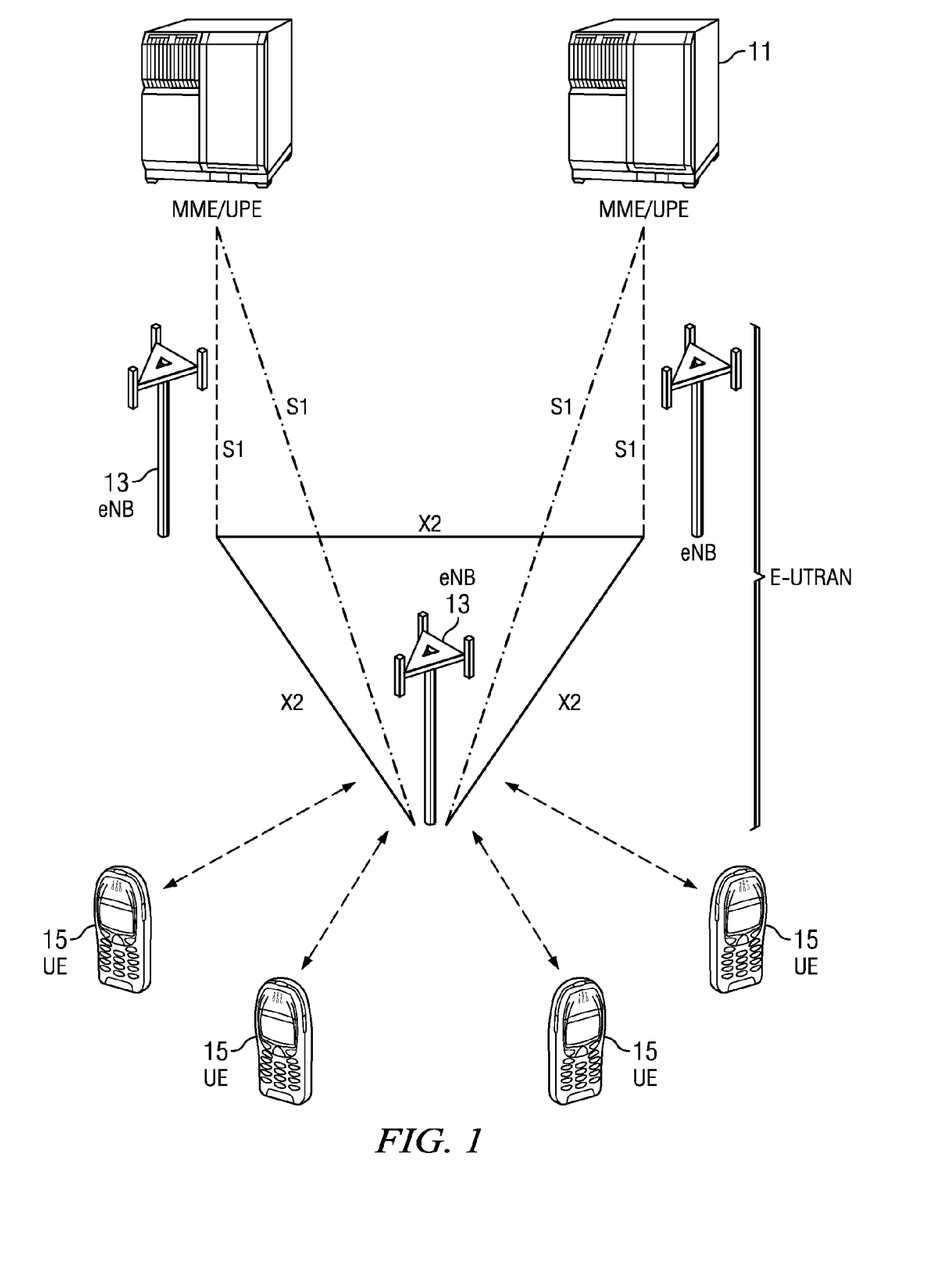
FIG. 1 illustrates user equipment communicating from an e-Node B to a variety of UEs over an air interface, and an e-UTRAN communications system according to an advantageous embodiment of the present invention.

Referring initially to FIG. 1, a system level diagram for a packet based wireless communication system that provides an environment for the application of the principles of the present invention is illustrated. The wireless communication system provides an example e-UTRAN architecture including base stations 13 providing e-UTRAN user plane (packet data convergence protocol/radio link control/media access control/physical transport) and control plane (radio resource control) protocol terminations directed toward user equipment 15. The base stations 13 are shown interconnected with an X2 interface or communication link. The base stations 13 are also connected by an S1 interface or communication link to an evolved packet core ("EPC") including, for instance, MME/UPE 11 which may form an access gateway ("aGW," a system architecture evolution gateway). The S1 interface supports a multiple entity relationship between the mobility management entities/user plane entities and the base stations and supports a functional split between the mobility management entities and the user plane entities.

The base stations 13 may host functions such as radio resource management (e.g., internet protocol ("IP"), header compression and encryption of user data streams, ciphering of user data streams, radio bearer control, radio admission control, connection mobility control, and dynamic allocation of resources to user equipment in both the uplink and the downlink). Additional functions may include selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobility management entity/user plane entity MME/UPE 11 may host functions such as distribution of paging messages to the base stations, security control, terminating user plane ("U-plane") packets for paging reasons, switching of U-plane for support of the user equipment mobility, idle state mobility control, and system architecture evolution bearer control.

The user equipment 15 receives an allocation of a group of information blocks from the base stations (eNBs) 13. In FIG. 1, a MU-MIMO system is depicted. UEs 15 are provided with multiple antennas as are eNBs 13. As shown in this example, four UEs with MIMO capability may be provided in communication with an eNB.

Figure 2:
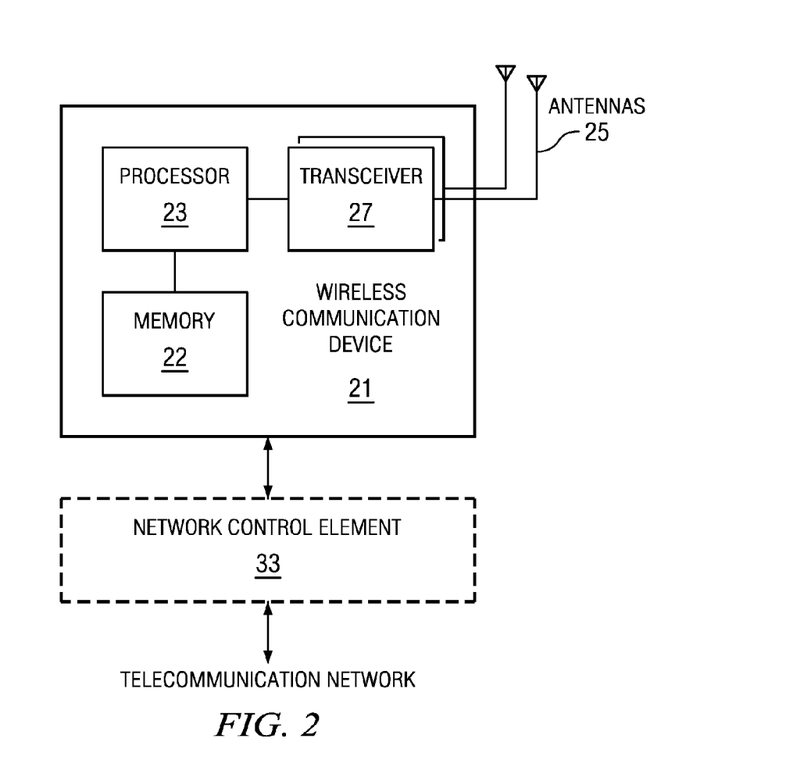
FIG. 2 illustrates a block diagram of a communication element according to an advantageous embodiment of the present invention.

FIG. 2 illustrates a simplified system level diagram of an example communication element of the communication system. FIG. 2 provides an illustration of an environment and structure for application of the principles of the present invention. The communication element may represent, without limitation, an apparatus including a base station, user equipment, such as a terminal or mobile station, a network control element, or the like. The communication element 21 includes, at least, a processor 23, memory 22 that stores programs and data of a temporary or more permanent nature, one or more antennas 25, and one or more radio frequency transceivers 27 coupled to the antennas and the processor for bidirectional wireless communication. Other functions may also be provided. The communication element 21 may provide point-to-point and/or point-to-multipoint communication services.

The communication element 21, such as a base station in a cellular network, may be coupled to a communication network element 33, such as a network control element of a public switched telecommunication network. The network control element may, in turn, be formed with a processor, memory, and other electronic elements (not shown). The network control element 33 generally provides access to a telecommunication network such as a public switched telecommunication network ("PSTN") or the Internet. Access may be provided using fiber optic, coaxial, twisted pair, microwave communication, or similar communication links coupled to an appropriate link-terminating element. A communication element 21 formed as a mobile station is generally a self-contained user equipment (UE) device intended to be carried by an end user and connects wirelessly to an eNB, thus in that case, it is not directly connected to element 33.

The processor 23 in the communication element 21, which may be implemented with one or with a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element 21 may be of any type suitable to the local application environment, and may include one or more of general-purpose computers, special-purpose computers, microprocessors, digital signal processors ("DSPs"), and processors based on a multi-core processor architecture, as non-limiting examples.

The transceivers 27 of the communication element 21 modulate information onto a carrier waveform for transmission by the communication element via the antennas 25 to another communication element. The transceiver demodulates information received via the antennas for further processing by other communication elements. In FIG. 2, the device 21 has multiple antennas 25 and corresponding transceivers 27.

The memory 22 of the communication element 21, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory 22 may include program instructions that, when executed by an associated processor, enable the communication element to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above. Further, the communication element 21 may store in memory 22 various information that persists, including configuration information, for use in communicating over the air interface.

FIG. 2 depicts a communication element 21 that has multiple antennas 25. Current specifications for the 3G standard contemplate eNBs with 1, 2 or 4 antennas, likewise UEs may have 1, 2 or 4 antennas, and these multiple antenna arrangements may be extended to more than 4 in future standards. For a MU-MIMO UE, at least 2 antennas and associated transceiver circuitry may be provided.

Figure 3:
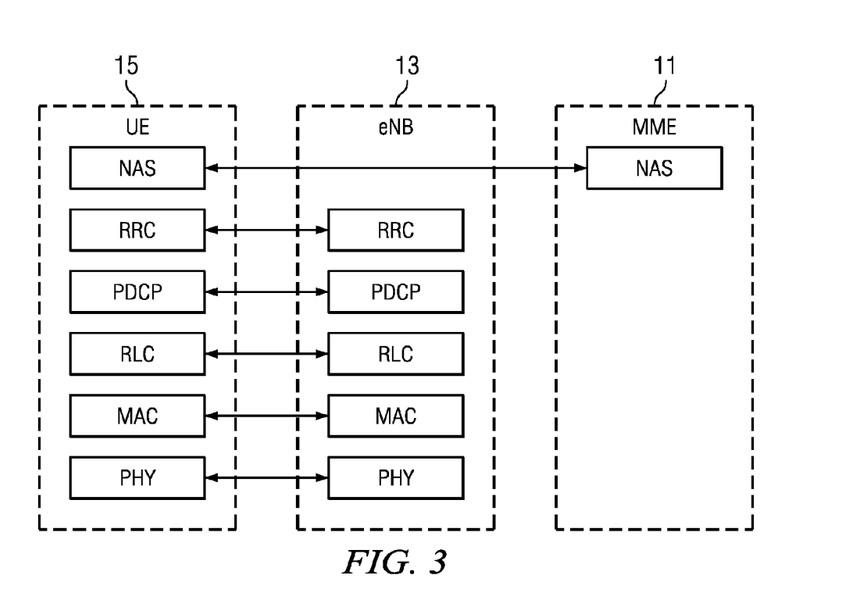
FIG. 3 illustrates communication layers of a UE, eNB and MME according to an advantageous embodiment of the present invention.

FIG. 3 depicts a block diagram of an embodiment of user equipment 15 and a base station 13 constructed according to the principles of the present invention. The user equipment UE 15 and the base station eNB 13 each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment and the mobile management entity 11 include a non-access stratum ("NAS") subsystem.

The physical layer subsystem supports the physical transport of packets over the air interface and provides, as non-limiting examples, cyclic redundancy check ("CRC") insertion (e.g., a 24 bit CRC is a baseline for physical downlink shared channel ("PDSCH"), channel coding, physical downlink control channel ("PDCCH") coding, physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as common multicast channel ("MCH") scrambling for all cells involved in a specific multimedia broadcast multicast service single frequency network ("MBSFN") transmission. The physical layer subsystem also performs signal modulation such as quadrature phase shift keying ("QPSK"), 16 quadrature amplitude modulation ("QAM") and 64 QAM, layer mapping and pre-coding, and mapping to assigned resources and antenna ports. The media access layer ("MAC") performs the HARQ functionality and other important functions between the logical transport layer, or Layer 2, and the physical transport layer, or Layer 1.

Each layer is implemented in the system and may be implemented in a variety of ways. A layer such as the PHY in the UE 15 may be implemented using hardware, software, programmable hardware, firmware, or a combination of these as is known in the art. Programmable devices such as DSPs, reduced instruction set ("RISC"), complete instruction set ("CISC"), microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or e-Node B implementations, faster and easier to perform in the design and commercial production of new devices.

Figure 4:
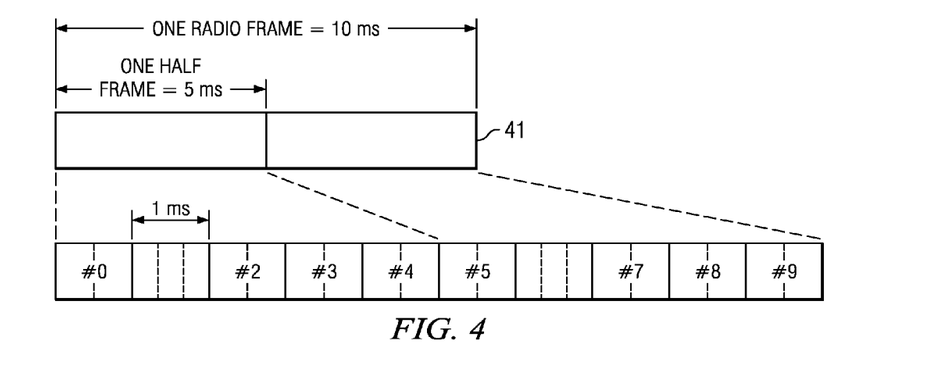
FIG. 4 illustrates a radio frame as used in systems where embodiments of the present invention are applicable.

FIG. 4 depicts the basic arrangement of an exemplary radio frame for LTE TDD communications. A similar frame will be used for LTE-A TDD communications. The radio frame 41 is 10 milliseconds long. Each frame is divided into two half-frames of 5 milliseconds, and each half-frame has 5 sub-frames of 1 millisecond duration. The proportion of uplink (UL) and downlink (DL) subframes in a radio frame is dependent on the configuration selected, and may be varied. Another frame structure is provided for FDD communications which are also supported.

For additional information about the physical layer implementation and configurations for 3GPP, Release 8, reference is made to the Technical Specification numbered 3GPP TS 36.211, version 8.5.0, dated 12-2008, entitled "Physical Channels and Modulation"; the Technical Specification numbered 3GPP TS 36.212, version 8.5.0, 12-2008, entitled "Multiplexing and Channel Coding"; and the Technical Specification numbered 3GPP TS 36.213, version 8.5.0, dated 12-2008, entitled "Physical Layer Procedures". Each of these documents is available from the 3GPP website at the URL www.3gpp.org; and each of these documents is hereby incorporated by reference herein in its entirety.

As described above in the background section, the use of DAI encoding is present in the LTE Release 8 standards and will be used in the LTE_A systems. However, the implementation of the ACK/NAK function including the complexities presented by the use of the aggregated CCs in LTE_A have not been addressed in the prior art. A co-pending patent application, Ser. No. 61/197,826, entitled "Backwards Compatible Downlink Assignment Index" which has common inventors and common ownership to the present application, which is hereby incorporated by reference herein in its entirety, addresses approaches for providing ACK/NAK on a physical uplink shared channel (PUCSCH) for LTE-A. The co-pending patent application proposes to have one-to-one or many-to-one mapping between the CC(s) and the UL grant(s) as follows:

For each UL grant, DL grants scheduled on the associated CCs (out of the entire "scheduling window") form a "DL grant region".

Both UL DAI and DL DAI are used to indicate the number (total or previous) of DL grants within the associated "DL grant region".

However, this approach addressing ACK/NAK and DTX support for PDSCH and PUSCH channels does not provide any solution to the problems addressed herein in providing ACK/NAK and DTX responses on the PUCCH, because the mapping relationship relied upon in the co-pending patent application does not exist for the PDCCH/PUCCH case.

Figure 5:
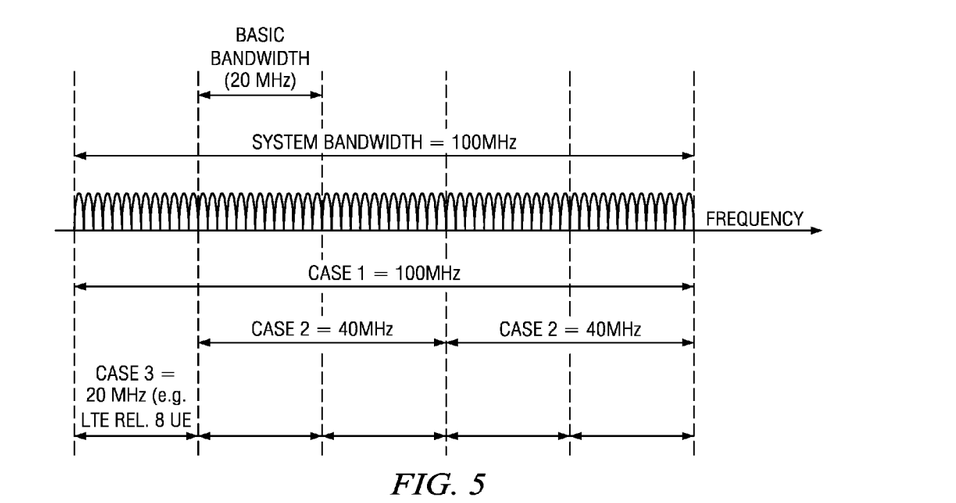
FIG. 5 illustrates in a frequency diagram the use of aggregate component carriers in a system where the embodiments of the invention are applicable.

FIG. 5 depicts in a simple prior art illustration the use of the aggregate component carriers in terms of the system bandwidth. In FIG. 5, the total system bandwidth is shown as 100 MHz (frequency). In Case 1, a first case for LTE-A with aggregated component carriers, all of this bandwidth is aggregated and used by a single UE device. In case 2, the bandwidth is partially aggregated into two 40 MHz groups, so a 20 MHz grouping remains. This remaining bandwidth may be used, for example, by a Release 8 LTE UE, which only requires 20 MHz. In Case 3, none of the CCs are aggregated and so 5 20 MHz components are available for 5 different UEs.

In a report labeled 3GPP TSG RAN WG1 meeting #56b is (R1-091526) Seoul, Korea, 23-27 Mar. 2009, entitled "UL ACK/NAK transmission in LTE-A", which is available from the 3GPP at website URL www.3gpp.org, the concept of CC grouping is described. A number of DL component carriers and TDD subframes are arranged to form C groups; c1, c2, c3, c4, in a predefined way. These C groups are then configured to generate group-specific ACK/NAK/DTX information based on up to M input bits per group. The group specific ACK/NAK/DTX information is generated by means of bundling or multiplexing of ACK/NAK bits corresponding to different component carriers CCs, TDD subframes, and spatial layers within the group. Regardless of the grouping shown in FIG. 6, (UL/DL) resource allocation grants transmitted on PDCCH corresponding to PDSCH(s) of different component carriers and TDD subframes may be separately encoded.

Figure 6:
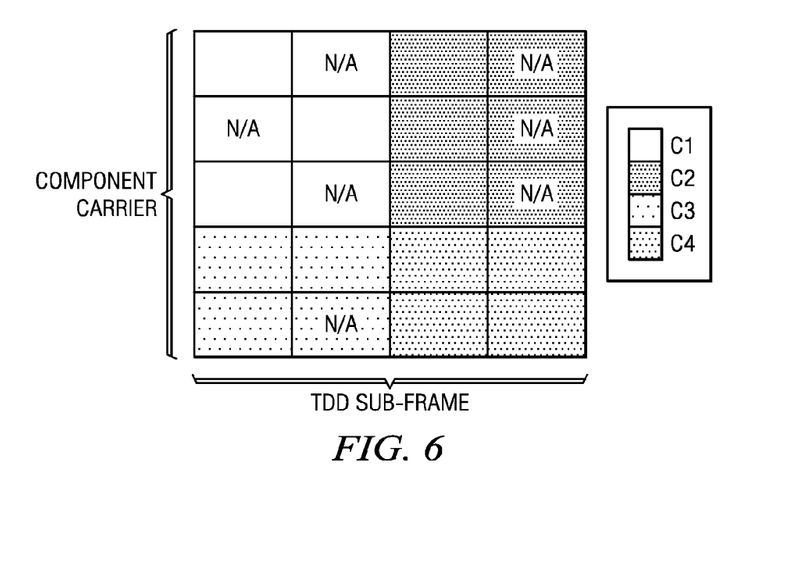
FIG. 6 illustrates a CC and TDD subframe grouping of the prior art.

FIG. 6 illustrates the grouping concept. On the component carriers, C groups c1, c2, c3, and c4 are shown with different shading, and the TDD subframes are shown running left to right in the figure. NAK/ACK message information is shown in different TDD subframes on the component carriers, for the groups c1-c4, labeled N/A. Embodiments of the present invention will use this grouping concept as further detailed below.

Presently, the prior art approaches proposed do not contemplate the ACK/NAK signaling needed to support LTE-A. Specifically, the prior art approaches do not provide the ACK/NAK uplink signaling that takes into account the error case handling needed for separate PDCCH UL and DL grants when these dedicated resource allocation grants correspond to different component carriers (CCs) and TDD subframes.

Embodiments of the present invention provide two features which may be used together to perform ACK/NAK signaling on PUCCH for LTE-A systems while addressing the error cases. In one embodiment, a novel DAI encoding is provided for the aggregated CC case as used in LTE-A. In one embodiment method, an intra-group encoding approach for DAI is used. In an alternative embodiment method, an inter-group encoding method for DAI is used. In both of these novel embodiments, two DAI bits are included in the PDCCH downlink grant. The use of the DAI encoding in the downlink grant enables the UE and eNB to handle error cases related to the grouping of ACK/NAK feedback signals corresponding to multiple CCs and TDD subframes. These error cases occur when a CC/TDD subframe specific PDCCH downlink grant allocation is not correctly received by the UE. Without the DAI encoding of the invention, the UE and eNB would not be able to correctly handle these errors.

In another aspect of the present invention, embodiments provide for arranging the ACK/NAK signal feedback on the PUCCH on top of the configurable grouping. In one embodiment scheme, a semi-static grouping is used. In an alternative embodiment a dynamic grouping is used. The ACK/NAK signals are then transmitted on the UL to report the results of previous DL transmissions.

Figure 7:
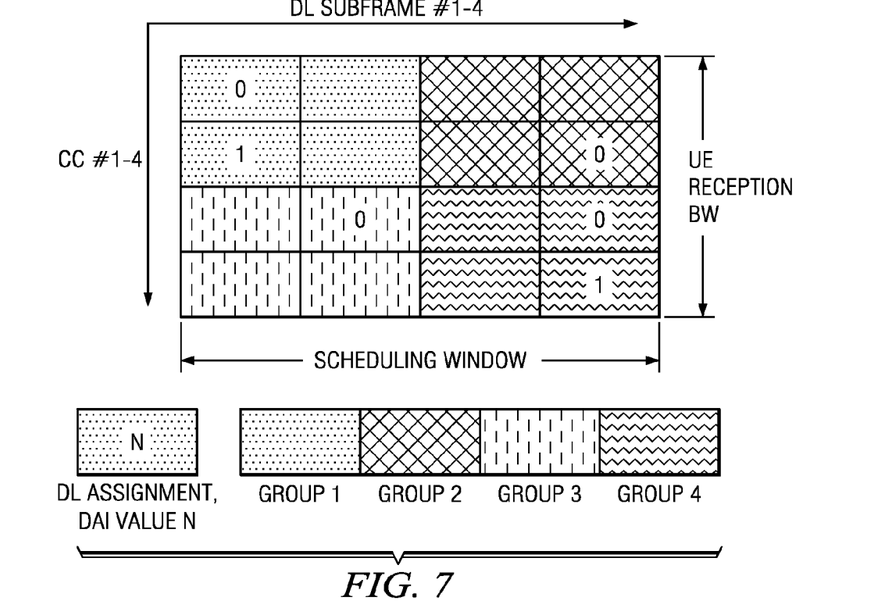
FIG. 7 illustrates an exemplary embodiment of a DAI value encoding of the invention.

FIG. 7 presents in a simple diagram a method for encoding the DAI in the "intra-group" embodiment method. In this exemplary embodiment, the DAI encoding is group specific; that is, the DAI encoding begins again with each group. In the embodiment, a DAI counter is used where the count is equal to the number of previous grants within the group. For each group, the DAI counter is incremented from 0, 1, . . . $N_i-1$ where $N_i$ is the number of DL grants within the ith group. The DAI counter is numbered first in the frequency domain and in the time domain for each group and the number begins at 0. Equation 1 expresses the value of the DAI Counter.

$$DAI\text{Counter}=0,1,2,\ldots N_i-1; \text{ where } N_i=\text{number of } DL \text{ grants in the ith group.} \quad (1)$$

The DAI Value is then obtained by applying a modulo operation; here, MOD 4 is used. Equation 2 provides an expression for this step:

$$DAI\text{Value}=DAI\text{Counter MOD 4} \quad (2)$$

FIG. 7 illustrates a non-limiting, exemplary case example of the method in application. Here, there are 4 CCs and 4 subframes divided into 4 groups. There are 2, 1, 1 and 2 DL grants in the 4 groups, respectively. The groups are indicated as Group 1, Group 2, Group 3, and Group 4 by shading in FIG. 7.

For the first group, the first DL grant has no predecessor so the count is 0. For the second DL grant in the first group, the count is 1. In group 2, there is only 1 DL grant, so it gets a DAI count of 0. Similarly, in group 3, there is only 1 DL grant and it too gets a count of 0. In Group 4, the first DL grant starts at count 0, and then the second DL grant gets a DAI count of 1. Since the MOD 4 operation does not change the count values in this example, the DAI Values are shown as 0, 1 for Group 1, 0 for Group 2, 0 for Group 3 and 0, 1 for Group 4, respectively.

In an alternative embodiment method for DAI encoding, "inter-group" encoding is used. In this approach, the DAI counter starts at 0 and increments to the total number of DL grants within the UE reception bandwidth for the frequency domain and within the scheduling window for the time domain; that is, the counter is not reset for each group. Thus, the DAI counter=0, 1, 2 ... N−1, where N is the total DL grants observed for all the groups. Equation 3 provides a simple expression. After the DAI count is determined, a MOD 4 operation is performed to obtain a DAI value. Equation 4 provides this expression.

$$DAI\text{Counter}=0,1,2\ldots N-1 \text{ Where } N \text{ is the total number of } DL \text{ grants} \quad (3).$$

$$DAI\text{Value}=DAI\text{Counter MOD 4} \quad (4)$$

Figure 8:
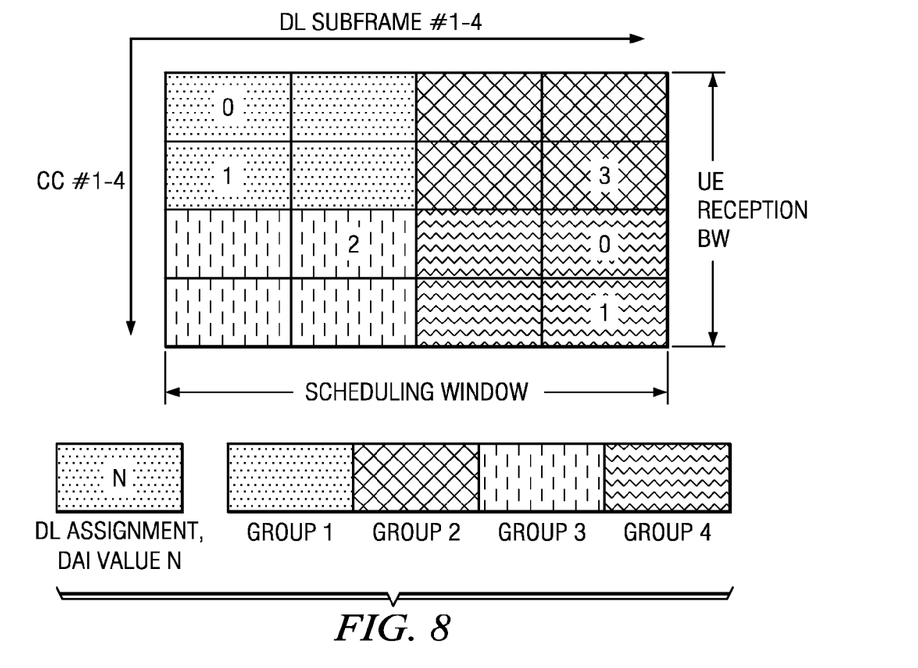
FIG. 8 illustrates yet another exemplary embodiment of DAI value encoding of the invention.

In FIG. 8, an example of the application of this embodiment is shown for a non-limiting illustrative case. In FIG. 8, again four groups are shown in the scheduling window, with 4 component carriers and 4 TDD subframes. The groups are indicated by shading Group 1, Group 2, Group 3, and Group 4. The numerical values shown in some blocks represent the DAI value determined using the inter group method embodiment, as follows.

For Group 1, there are two DL grants. For Group 2, there is one downlink grant. For Group 3, there is one DL grant and for Group 4, there are two DL grants. Thus, in this illustrative case, there are a total of 6 DL grants. Using the inter group method for the DAI counter, the counter will be incremented from 0 . . . 5. Applying the DAI value method step of using MOD 4, then the DAI values shown in FIG. 8 are obtained, e.g. 0, 1 for Group 1; 2 for group 2, 3 for Group 3, and 0, 1 for Group 4. These values are depicted in the appropriate CC/TDD subframe block of FIG. 8.

The DAI encoding schemes of the two alternative embodiments are shown in FIGS. 7 and 8. Because the DAI encoding schemes are still formed as DAI values of 2 bits, there is no backwards compatibility problem with using systems compliant with LTE Release 8 in TDD mode. The use of the embodiments is compatible with the use of Release 8 equipment.

In another aspect of the embodiments of the invention, methods are now presented for providing the feedback of the ACK/NAK information. Two alternate method embodiment approaches are provided that address the trade off between system throughput (efficiency) and UL coverage in LTE-A systems in TDD mode.

In one method embodiment, semi-static grouping is used to provide the ACK/NAK feedback. In this approach, C groups and M subgroups are defined by higher layer operations. This information may be transmitted to the UE as control bits in an initialization message. This approach may be used in conjunction with either the inter group or the intra group DAI encoding scheme described above.

In an alternative method embodiment, dynamic grouping for ACK/NAK feedback may be used. In this embodiment, C groups and M subgroups are formed according to parameters C and M that are signaled to the UE by the eNB. These parameters may be either cell-specific or UE-specific. The group division between CCs and subframes may be made in a pre-defined way. As one approach, which is non-limiting, there may be C+ groups. Each C+ group contains $\lceil N/C \rceil$ consecutive ACK/NAK bits and C_groups, each contains $\lfloor N/C \rfloor$ consecutive ACK/NAK bits, where N is the total number of DL grants observed at the UE side and C+=N mod C, and C_=C−C+. The operation $\lceil N/C \rceil$ is a ceiling operation; that is, $\lceil 5/2 \rceil=3$, for example. The operation $\lfloor N/C \rfloor$ is a floor operation; that is, $\lfloor 5/2 \rfloor=2$, for example.

After the grouping has been configured, the UE may transmit the ACK/NAK information according to the following steps:

Step #1: Within each subgroup, ACK/NAK bits are first bundled in the spatial/CC/time domain to generate M ACK/NAK feedback bits.

Step #2: A channel selection technique is applied to carry M ACK/NAK feedback bits per group. In the alternative, some other technique is used to carry M ACK/NAK feedback bits per group.

Step #3: After the channel is selected, the UE transmits ACK/NAK/DTX feedback corresponding to C parallel groups, on the selected or predefined channels.

Figure 9:
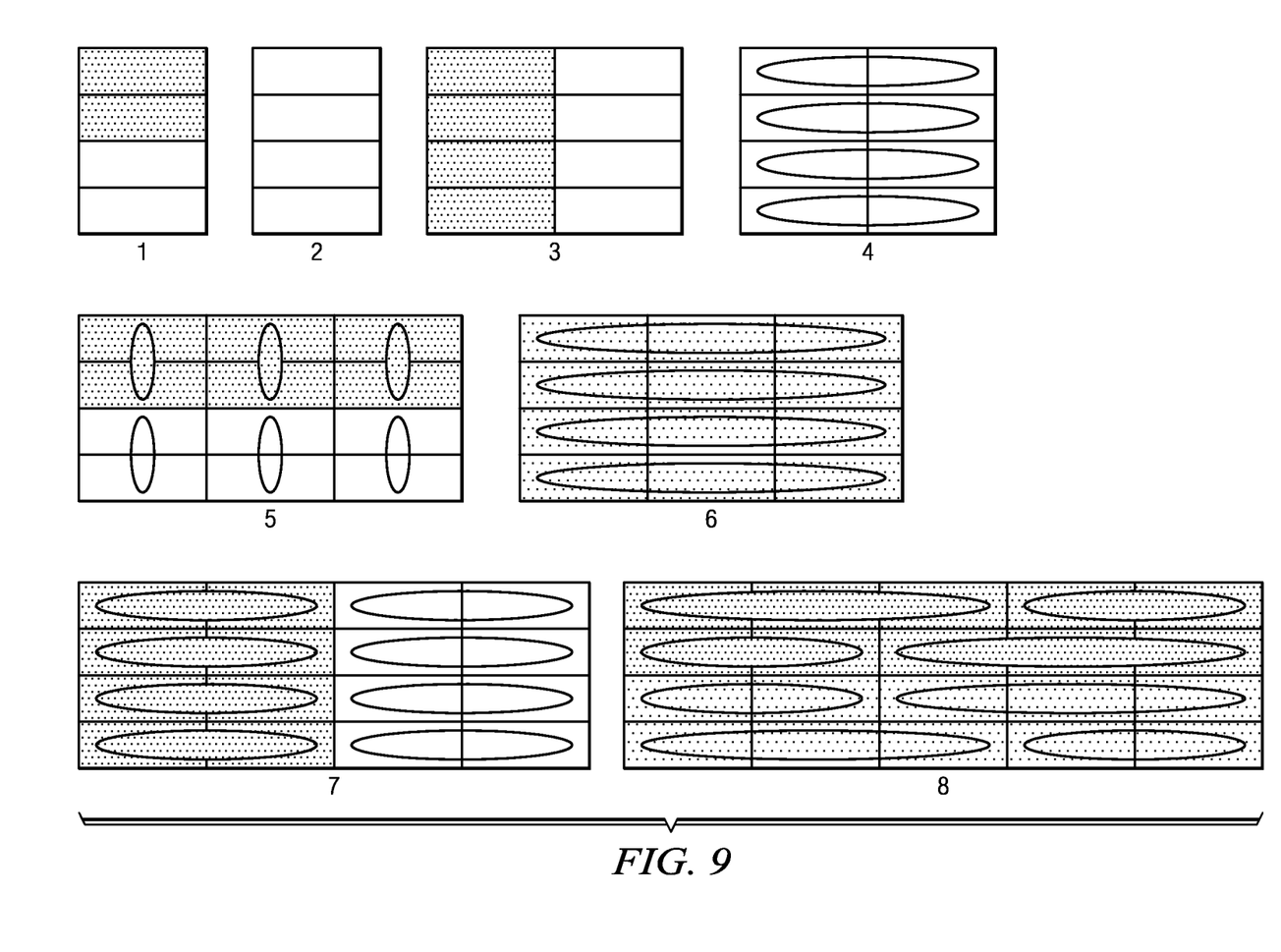
FIG. 9 illustrates patterns used for ACK/NAK signaling in another exemplary embodiment of the invention.

FIG. 9 illustrates various configurations 1-8 of pre-defined grouping patterns that are combined with the embodiment ACK/NAK signaling scheme for providing feedback of the ACK/NAK information from the UE, on PUCCH for example. The shading indicates different groups and the circle shape indicates the subgroups in which domain the ACK/NAK bundling is applied. For example, for configuration 7, 2 groups and 4 subgroups per group are configured. Within each group, 4 ACK/NAK/DTX feedback are generated via ACK/NAK bundling within each subgroup. Then channel selection is performed within each group to carry 4 ACK/NAK/DTX feedback signals. Finally, all ACK/NAK/DTX feedback signals are sent via parallel selected PUCCH format 1b channels.

Figure 10:
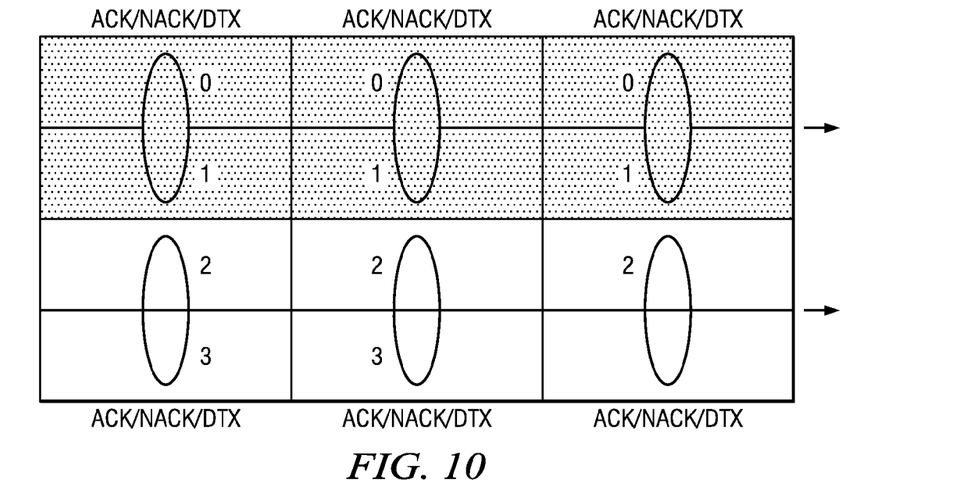
FIG. 10 illustrates in detail one of the ACK/NAK signaling patterns of FIG. 9 in an embodiment of the invention.

FIG. 10 depicts in a more detailed view the pattern 5 of FIG. 9. In FIG. 10, DAI encoding for "inter group" was applied. ACK/NAK bits corresponding to all of the observed DL grants (observed by the UE) are arranged into 2 groups and 3 subgroups per group as shown in FIG. 10. Each subgroup will provide one ACK/NAK/DTX state indication by the use of ACK/NAK bundling. To transmit this information, proper channel and QPSK constellation point selection (or encoding scheme in general) is done within each group to carry ACK/NAK feedback corresponding to 3 subgroups. Finally, the ACK/NAK/DTX feedback information corresponding to the 2 groups will be transmitted in parallel using two PUCCH Format 1b channels, or using another encoding scheme corresponding to 2 groups. The 2 arrows of FIG. 10 indicate an uplink transmission in parallel (contemporaneously in time) on the 2 channels.

There is a need for error handling when the UE does not observe correctly all of the DL grants transmitted by the eNB. There is a risk that the bundled ACK signal is generated while the last N DL grants are missed at the same time. As an example, consider a case where 10 DL assignments within one "scheduling window" are scheduled, then the 2 bits for the DAI values will be 0, 1, 2, 3, 0, 1, 2, 3, 0, 1, respectively. If the UE only observes or receives the first 7 DL grants and the last 3 are missed, then from the UE side, it will observe 7 DL grants with DAI values 0, 1, 2, 3, 0, 1, 2. Since the DAI indexes are continuous in this example, the UE will not be aware of the missed detection of the other 3 DL grants.

In this error case, the uplink ACK/NAK bundled signals transmitted do not correspond to the true ACK information. The following method embodiments are provided as embodiments of the invention that may be used to handle this error situation, known as a "DTX to ACK" error situation.

First, as a simplifying case assumption, the most likely case is that the last DL grant is missing. The possibility of the last N continuous DL grants missing is much lower, so that case is not treated here.

In one embodiment, the UE indicates the last received PDCCH DL grant explicitly by always using the PUCCH resource corresponding to the last received DL grant. This approach or implementation embodiment is suitable for at least the ORT (orthogonal resources transmission) case for PUCCH diversity with multiple antennas. In this signaling diversity approach, the UE will utilize PUCCH diversity based on the usage of multiple PUCCH format 1a/1b resources. It is noted that presently, this proposed scheme is getting increased support as a potential part of the signaling standards in 3GPP. In such a case, the UE can select the PUCCH resource that corresponds to the last observed or received DL grant, thus the eNB receiving the PUCCH knows which one is the last received DL grant by the UE.

This approach or implementation embodiment is also suitable for at least the SCTD (Single-carrier transmit diversity) case for PUCCH diversity with multiple antennas. SCTD is also referred to as the ORT scheme in 3GPP Ran1 discussions. In SCTD or ORT, diversity gain is achieved via transmitting the same PUCCH information from multiple antennas at the UE with orthogonal PUCCH resources. This scheme is under consideration as one candidate transmit diversity scheme for PUCCH channel in LTE-A. In such a case, multiple orthogonal PUCCH channels are needed for the multiple antennas. In this embodiment method for implicitly signaling the last received DL grant, the UE can select the PUCCH resource that corresponds to the last observed or received DL grant and use it as one PUCCH channel required by ORT transmission. Upon receiving the PUCCH, the eNB receiving the PUCCH knows which DL grant is the last received DL grant by the UE. For example, in a non-limiting illustration, suppose there are C=1 group and the UE has 2 antennas, then in the ORT case, the UE can select the PUCCH channel for one antenna according to the channel selection of the M subgroups, while selecting the PUCCH channel for the other antenna according to the last received DL grants.

In another alternative approach that is also a method embodiment, the UE indicates the DAI value 'V' of the last received PDCCH within each group implicitly, via a channel selection.

In this alternative approach, the UE makes a PUCCH resource selection (that the UE is otherwise free to select from any one of the PDCCH channels within the selected subgroup) in a manner that indicates implicitly the value V. On receiving the uplink signals, the eNB will know which is the last observed DL grant at the UE side, and the eNB and the UE will have a common understanding about the status of the received DL grants.

To perform this selection, one subgroup is selected, via channel selection, within each subgroup. For an illustrative example, if the DAI of the last received DL grant is 2, then the UE can select the third resource within the selected subgroup to send the ACK/NAK results. In this way, the eNB will know which DL grant is the last one the UE received safely.

Thus, the embodiments provide at least two methods for performing DAI encoding, several methods for providing ACK/NAK feedback, and methods for transmitting the information. These embodiments may be used to provide error handling and ACK/NAK support for LTE-A systems using TDD and the aggregated CCs on the PUCCH channels while remaining fully compatible with Release 8 of the LTE standards, because for example, the DAI value remains at two bits. Also, no "predication scheduling" is required in the time domain, as the CC first "pure counter" encoding of the DAI counter is used.

The methods described in the embodiments also provide a means to handle the "last DL grant missing" in various alternative embodiments. The error cases where more than the last DL grant is missing are not expressly addressed by these embodiments. For example, if four consecutive DL grants are missing, that case is not handled by the embodiments described here. This case is so rare in probability that it is not an issue. The case where more than the last DL grant is missing, e.g. the last 'n' grants are missing, is not specifically considered in these embodiments. However, the error handling approaches of release 8 LTE may also be applied with the embodiment methods described here for this case.

Methods described here also provide embodiments for the ACK/NAK feedback from the UE using either semi-static grouping or dynamic grouping. The semi-static grouping is determined at higher levels; the scheduler can then direct the UE to use the appropriate pattern in order to improve ACK/NAK feedback efficiency while considering traffic, signal strength and quality, etc. In dynamic grouping, the pattern used at the UE side is based on assignments each time to further improve the ACK/NAK efficiency. However, the dynamic approach may require DAI signaling in the UL messages, thus increasing the use of resources in the signaling traffic and increasing the complexity of the UE.

The UEs of the present embodiments may implement the ACK/NAK feedback method embodiments in a variety of ways and the embodiment and any appended claims contemplate and cover these alternatives as part of the invention. These functions may be provided as hardware, as part of an integrated circuit or integrated circuits, or as software executed on a programmable processor that may provide part or all of the UE functions. A dedicated processor or co-processor could be used. The UE may have various types of storage for storing the pre-coding information, the codebook, and other parameters.

In another embodiment, a computer program is provided comprising executable instructions stored on a machine readable storage device, wherein when the instructions are performed by a programmable processor within a communications terminal configured to transceive signals on an over the air interface (such as a UE or eNB, for example), the communications terminal performs the methods of identifying groups of frames or subframes to be transmitted in parallel over a plurality of aggregated component carriers to a second communications terminal over the air interface; indexing a downlink assignment index counter by counting the downlink allocation grant signals to be transmitted in the groups of frames or subframes; encoding the downlink assignment index counter into a downlink assignment index value by performing a modulo operation on the downlink assignment index counter; and transmitting the groups of frames or subframes including the downlink allocation grant signals and the downlink assignment index value to a receiver within the second communications terminal.

Although various embodiments of the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to advantageously coordinate allocation of resources for user equipment to be handed over from a source base station to a target base station without contention and without a need for sharing timing information therebetween, as described herein.

Moreover, the scope of the present application is not intended to be limited to the particular embodiments of the process, machine, manufacture, and composition of matter, or means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
identifying groups of information frames or subframes to be transmitted in parallel over a plurality of aggregated component carriers to a communications terminal over an air interface;
indexing a downlink assignment index counter by counting downlink allocation grant signals to be transmitted in the groups of information frames or subframes;
encoding the downlink assignment index counter into a downlink assignment index value by performing a modulo operation on the downlink-assignment-index counter; and
transmitting, over the plurality of aggregated component carriers, the groups of information frames or subframes including the downlink allocation grant signals and the downlink assignment index value to a receiver within the communications terminal.

2. The method of claim 1, wherein indexing the downlink assignment index counter further comprises incrementing a counter.

3. The method of claim 2, wherein incrementing the counter comprises performing a function DAICounter=0, 1, 2, ... $N_i-1$; where $N_i$=number of downlink grants in the ith group, for each group.

4. The method of claim 2, wherein incrementing the counter further comprises incrementing the counter first in a frequency domain and then in a time domain.

5. The method of claim 2, wherein incrementing the counter comprises performing a function DAICounter=0, 1, 2 ... N−1; where N is the total number of downlink grants in the receiver reception window.

6. The method of claim 1, wherein encoding the downlink assignment index comprises performing a function MOD 4 on the value of the downlink assignment index counter.

7. The method of claim 1, wherein transmitting the groups of frames or subframes including the downlink allocation grant signals and the downlink assignment index value further comprises:
forming a physical downlink control channel;
modulating the signals to be transmitted; and
transmitting the modulated signals over the air interface.

8. The method of claim 1, further comprising:
receiving over the air interface an uplink message from the receiver;
decoding the uplink message; and
recovering for each downlink allocation grant in the transmitted message one of an acknowledgement signal, a not acknowledgement signal, and a discontinuous transmission signal.

9. The method of claim 8, wherein receiving the uplink message further comprises receiving over the air interface a physical uplink control channel message.

10. The method of claim 9, further comprising: determining from an implicit selection of a transmission method for the uplink message the last of the transmitted downlink allocation grants that was correctly received by the receiver.

11. The method of claim 10, wherein the determining is performed based on the channel selected for the physical uplink control channel message.

12. A method, comprising:
forming a predetermined grouping of component carriers and frames or subframes to form subgroups of frames or subframes within each group;
forming a bundled information signal comprising at least one of an acknowledgement signal, a not acknowledgement signal and a discontinuous transmission message signal for each frame or subframe within each group; and
transmitting in parallel the bundled information signal on an uplink channel;
wherein the transmitting in parallel the bundled information signal comprises transmitting over an air interface using aggregated component carriers, and wherein transmitting in parallel the bundled information signal comprises:
forming information, comprising at least part of the bundled information signal, to be carried on a physical uplink control channel;
selecting from a plurality of channel resources a channel resource available to carry the information on the physical uplink control channel; and
transmitting the information on the selected channel resource.

13. The method of claim 12, wherein selecting the channel available for transmitting further comprises:
selecting the channel based on a last downlink allocation grant correctly received from a transmitter.

14. The method of claim 12, wherein the forming is based at least in part on a downlink allocation grant and a downlink assignment index value.

15. The method according to claim 14, wherein the downlink allocation grant and the downlink assignment index value are received in groups of frames or subframes.

16. The method of claim 12 wherein the transmitting in parallel comprises transmitting using a physical uplink control channel format 1b.

17. An apparatus, comprising:
at least one processor; and at least one memory including computer program instructions, where the at least one memory and the computer program instructions are configured, with the at least one processor, to cause the apparatus to at least:

receive and transmit signals over an air interface;

receive downlink allocation grants;

form at least one of an acknowledgement signal, a not acknowledgement signal and a discontinuous transmission message signal in response to received signals and the downlink allocation grants;

form a predetermined grouping of component carriers and frames or subframes to form subgroups of frames or subframes within each group;

form a bundled information signal comprising the at least one of the acknowledgement signal, the not acknowledgement signal and the discontinuous transmission message signal for each frame or subframe within each group; and transmit in parallel the bundled information signals on an uplink channel over the air interface, wherein the transmitting in parallel the bundled information signal comprises transmitting over the air interface using aggregated component carriers, and wherein transmit in parallel the bundled information signal comprises:

forming information, comprising at least part of the bundled information signal, to be carried on a physical uplink control channel;

selecting from a plurality of channel resources a channel resource available to carry the information on the physical uplink control channel; and transmitting the information on the selected channel resource.

18. The apparatus of claim 17, wherein the at least one memory including the computer program instructions is configured with the at least one processor to cause the apparatus to select the physical uplink control channel for transmission based on a last downlink allocation grant correctly received from a transmitter.

19. An apparatus, comprising:

at least one processor; and at least one memory including computer program instructions, where the at least one memory and the computer program instructions are configured, with the at least one processor, to cause the apparatus to at least:

receive and transmit signals on channels over an air interface to one or more second apparatus;

identify groups of frames or subframes to be transmitted in parallel over a plurality of aggregated component carriers to the one or more second apparatus over the air interface;

index a downlink assignment index counter by counting downlink allocation grant signals to be transmitted in the groups of frames or subframes;

encode the downlink assignment index counter into a downlink assignment index value by performing a modulo operation on the downlink assignment index counter; and transmit, over the plurality of aggregated component carriers, the groups of frames or subframes including the downlink allocation grant signals and the downlink assignment index value over the air interface to a receiver within the one or more second apparatus.

20. The apparatus of claim 19, wherein the at least one memory including the computer program instructions is configured with the at least one processor configured to cause the apparatus to index the downlink assignment index counter by incrementing a counter.

21. The apparatus of claim 20, wherein the at least one memory including the computer program instructions is configured with the at least one processor to cause the apparatus to increment the counter first in a frequency domain and then in a time domain.

22. An apparatus, comprising:

at least one processor; and at least one memory including computer program instructions, where the at least one memory and the computer program instructions are configured, with the at least one processor, to cause the apparatus to at least:

identify groups of information frames or subframes to be transmitted in parallel over a plurality of aggregated component carriers to a communications terminal over an air interface;

index a downlink assignment index counter by counting downlink allocation grant signals to be transmitted in the groups of information frames or subframes;

encode the downlink assignment index counter into a downlink assignment index value by performing a modulo operation on the downlink assignment index counter; and transmit, over the plurality of aggregated component carriers, the groups of information frames or subframes including the downlink allocation grant signals and the downlink assignment index value to a receiver within the communications terminal.

23. The apparatus of claim 22, wherein indexing the downlink assignment index counter comprises incrementing a counter.

24. The apparatus of claim 23, wherein incrementing the counter comprises performing a function DAICounter=0, 1, 2, . . . $N_i-1$; where $N_i$=number of downlink grants in the ith group, for each group.

25. The apparatus of claim 23, wherein incrementing the counter further comprises incrementing the counter first in a frequency domain and then in a time domain.

26. The apparatus of claim 23, wherein incrementing the counter comprises performing a function DAICounter=0, 1, 2 . . . N−1; where N is the total number of downlink grants in the receiver reception window.

27. The apparatus of claim 22, wherein encoding the downlink assignment index comprises performing a function MOD 4 on the value of the downlink assignment index counter.

28. The apparatus of claim 22, wherein transmitting the groups of information frames or subframes including the downlink allocation grant signals and the downlink assignment index value further comprises:

forming a physical downlink control channel;

modulating the signals to be transmitted; and transmitting the modulated signals over the air interface.

29. The apparatus of claim 22, wherein the at least one memory including the computer program instructions are configured with the at least one processor to cause the apparatus to:

receive over the air interface an uplink message from the receiver;

decoding the uplink message; and recover for each downlink allocation grant in the transmitted message one of an acknowledgement signal, a not acknowledgement signal, and a discontinuous transmission signal.

30. The apparatus of claim 29, wherein receiving the uplink message further comprises receiving over the air interface a physical uplink control channel message.

31. The apparatus of claim 30, wherein the at least one memory including the computer program instructions are configured with the at least one processor to cause the apparatus to determine from an implicit selection of a transmission method for the uplink message the last of the transmitted downlink allocation grants that was correctly received by the receiver.

32. The apparatus of claim 31, wherein the determining is performed based on the channel selected for the physical uplink control channel message.

33. An apparatus comprising,
at least one processor; and
at least one memory including computer program instructions, where the at least one memory and the computer program instructions are configured, with the at least one processor, to cause the apparatus to at least:
form a predetermined grouping of component carriers and frames or subframes to form subgroups of frames or subframes within each group;
form a bundled information signal comprising at least one of an acknowledgement signal, a not acknowledgement signal and a discontinuous transmission message signal for each frame or subframe within each group; and
transmit in parallel the bundled information signal on an uplink channel, wherein the transmitting in parallel the bundled information signal comprises transmitting over an air interface using aggregated component carriers, and wherein transmit in parallel the bundled information signal comprises:
forming information, comprising at least part of the bundled information signal, to be carried on a physical uplink control channel;
selecting from a plurality of channel resources a channel resource available to carry the information on the physical uplink control channel; and
transmitting the information on the selected channel resource.

34. The apparatus of claim 33, wherein selecting the channel available for transmitting further comprises:
selecting the channel based on a last downlink allocation grant correctly received from a transmitter.

35. The apparatus of claim 33, wherein the forming the predetermined grouping is based at least in part on a downlink allocation grant and a downlink assignment index value.

36. The apparatus of claim 35, wherein the downlink allocation grant and the downlink assignment index value are received in groups of frames or subframes.

37. The apparatus of claim 33, wherein the transmitting in parallel comprises transmitting using a physical uplink control channel format 1b.

* * * * *

UNITED STATES PATENT AND TRADEMARK OFFICE
CERTIFICATE OF CORRECTION

PATENT NO. : 8,565,167 B2  
APPLICATION NO. : 12/497434  
DATED : October 22, 2013  
INVENTOR(S) : Peng Chen, Chunyan Gao and Esa Tiirola Page 1 of 1

It is certified that error appears in the above-identified patent and that said Letters Patent is hereby corrected as shown below:

In the Claims

In Claim 1:
Column 15, line 47, "downlink-assignment-index" should be deleted and --downlink assignment index-- should be inserted.

Signed and Sealed this
Twenty-eighth Day of January, 2014

Michelle K. Lee
*Deputy Director of the United States Patent and Trademark Office*